(12) United States Patent
Widmer

(10) Patent No.: US 8,733,844 B1
(45) Date of Patent: May 27, 2014

(54) LIGHTWEIGHT CHAIR

(76) Inventor: Stanley W. Widmer, Browerville, MN (US)

( * ) Notice: Subject to any disclaimer, the term of this patent is extended or adjusted under 35 U.S.C. 154(b) by 0 days.

(21) Appl. No.: 13/482,292

(22) Filed: May 29, 2012

Related U.S. Application Data

(60) Provisional application No. 61/490,775, filed on May 27, 2011.

(51) Int. Cl.
*A47C 7/14* (2006.01)

(52) U.S. Cl.
USPC .................................. 297/452.41; 297/DIG. 3

(58) Field of Classification Search
USPC ........................................ 297/452.41, DIG. 3
See application file for complete search history.

(56) References Cited

U.S. PATENT DOCUMENTS

| | | | | |
|---|---|---|---|---|
| 2,952,304 | A * | 9/1960 | Pinkel | 297/216.13 |
| 3,682,431 | A * | 8/1972 | Vivian | 248/631 |
| 3,915,421 | A * | 10/1975 | Le Forestier | 248/631 |
| 4,046,348 | A * | 9/1977 | Goodwin | 248/423 |
| 4,538,854 | A * | 9/1985 | Wilson | 297/344.2 |
| 4,560,145 | A | 12/1985 | Widmer | |
| 4,778,216 | A * | 10/1988 | Stupakis | 297/17 |
| 6,460,478 | B1 | 10/2002 | Widmer | |
| 7,300,104 | B1 * | 11/2007 | Hagedorn | 297/158.3 |

* cited by examiner

*Primary Examiner* — Milton Nelson, Jr.
(74) *Attorney, Agent, or Firm* — Dicke, Billig & Czaja, PLLC

(57) ABSTRACT

A lightweight seat suitable for applications such as those in which the seat and occupant must withstand extreme amounts of applied force during use, e.g., encountering high waves in boats of seven meters (23 feet) or greater at speeds of at least 20 knots (37 km/h (or 10.3 m/s)).

12 Claims, 12 Drawing Sheets

LIGHTWEIGHT CHAIR

RELATED APPLICATION

This application claims the benefit of U.S. Provisional Application No. 61/490,775 filed May 27, 2011.

TECHNICAL FIELD

This application concerns lightweight seats for environments where the occupant is subjected to substantial random and/or sudden dynamic forces, e.g. buffeting, pounding, bouncing and the like.

BACKGROUND

High-performance vehicles subject their occupants to substantial random and/or sudden dynamic forces, and therefore the seats in which such occupants sit during motion must be extremely rugged in design and performance. An example is the seats suitable for high-speed, rugged marine craft such as rotationally molded boats in very large dimensions (e.g., seven meters (23 feet) or greater). The occupants of such seats must withstand extreme amounts of applied force during use, e.g., encountering high waves in boats of seven meters (23 feet) or greater at speeds of at least 20 knots (37 km/h (or 10.3 m/s)). At the same time, weight is always a concern in high-performance vehicles and, of course, the seat must be comfortable.

SUMMARY

A preferred embodiment of a lightweight seat is illustrated in the accompanying Figures and described below. This is only an example to illustrate the principles of the invention. The seat proper is mounted on a pedestal and base which has a permanently or temporarily inflated air bag to provide cushioning and, in the preferred embodiment, approximately 4 inches of vertical clearance to absorb forces and therefore moderate motion of the seat. A keyway or equivalent feature prevents the seat from pivoting around the vertical axis. Two rings help maintain the performance of the air bag.

The lightweight seat is particularly suitable for use with the Widmer Flex-Ride Night Raider, a boat having a plastic hull which flexes and absorbs impacts produced at high speeds in rough water because the impact G-forces are absorbed by the hull instead of directly translated to the occupants. The lightweight seat disclosed here further absorbs such forces instead of translating them to the occupants, and it does so at a substantial reduction in weight, which is a critical parameter in the design of an effective boat of this type and for this application.

BRIEF DESCRIPTION OF THE DRAWINGS

The accompanying drawings show particular embodiments as examples only, and are not intended to limit the scope of the claims.

DETAILED DESCRIPTION

General

Figure 1:
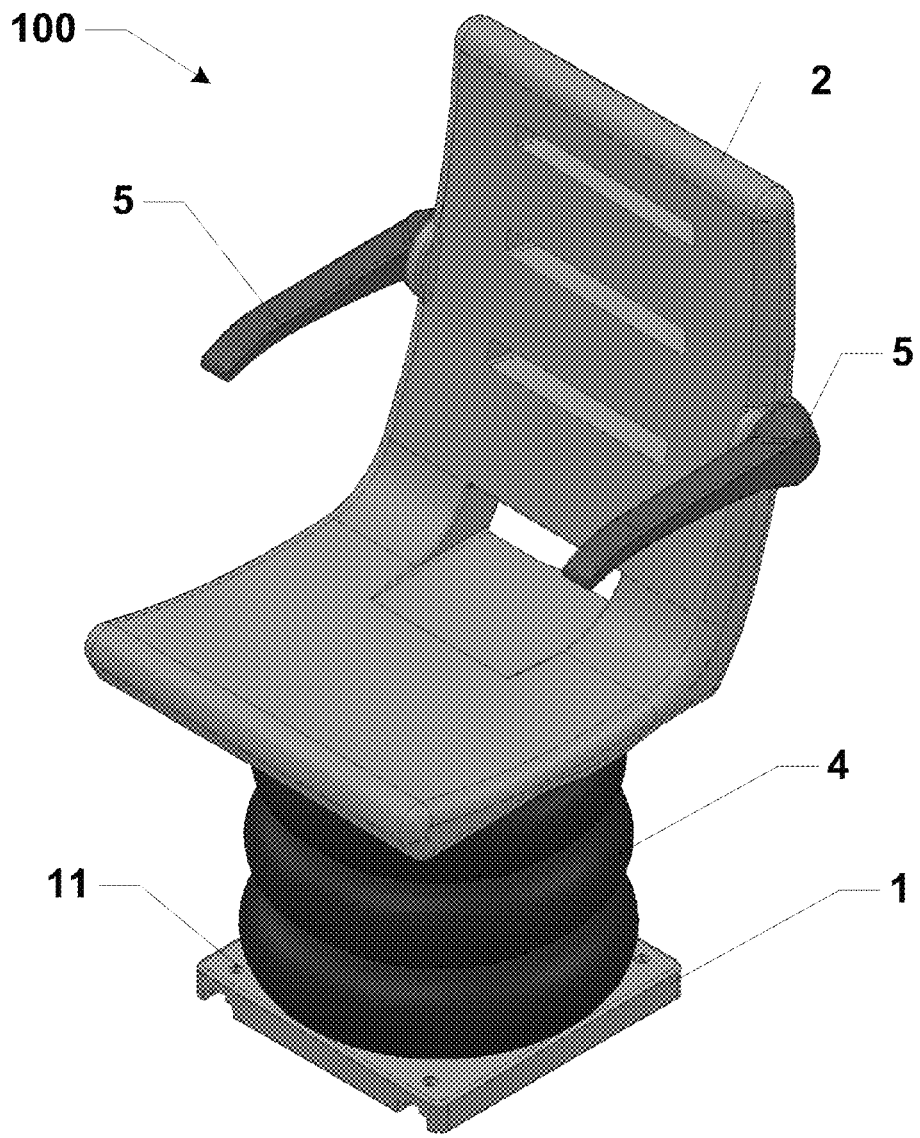
FIGS. 1-5 are perspective, front, back, left side (the right side being a mirror image of the left side), and top views of an assembled chair assembly.
Figure 2:
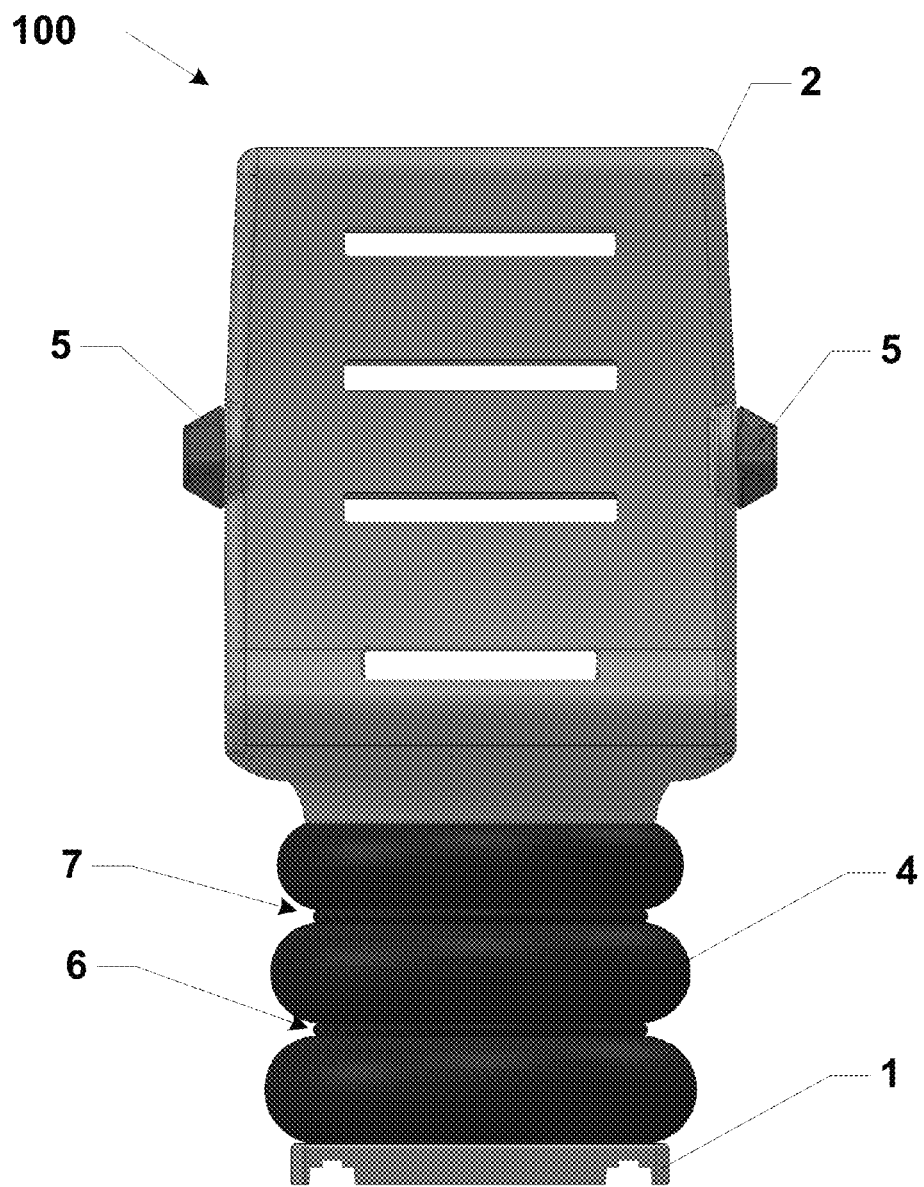
Figure 3:
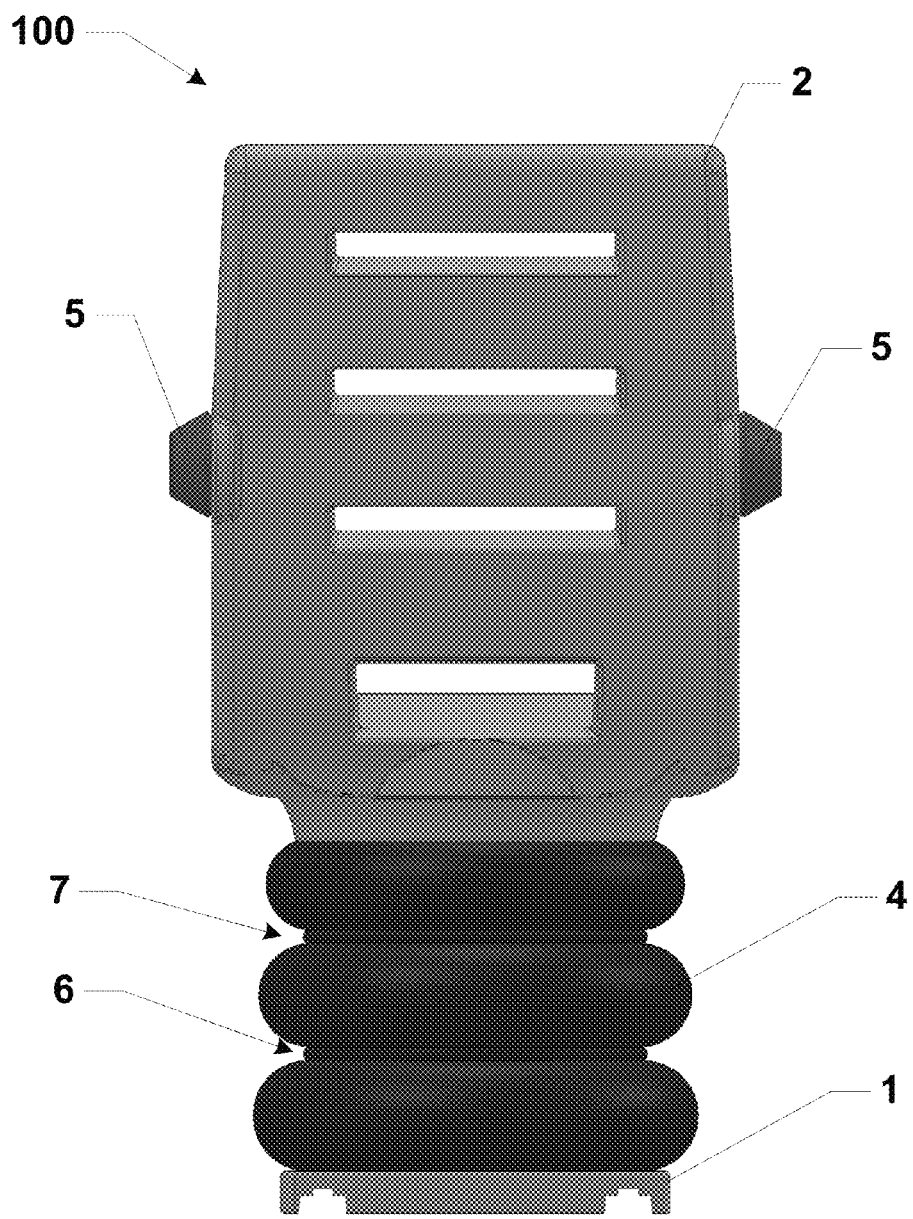
Figure 4:
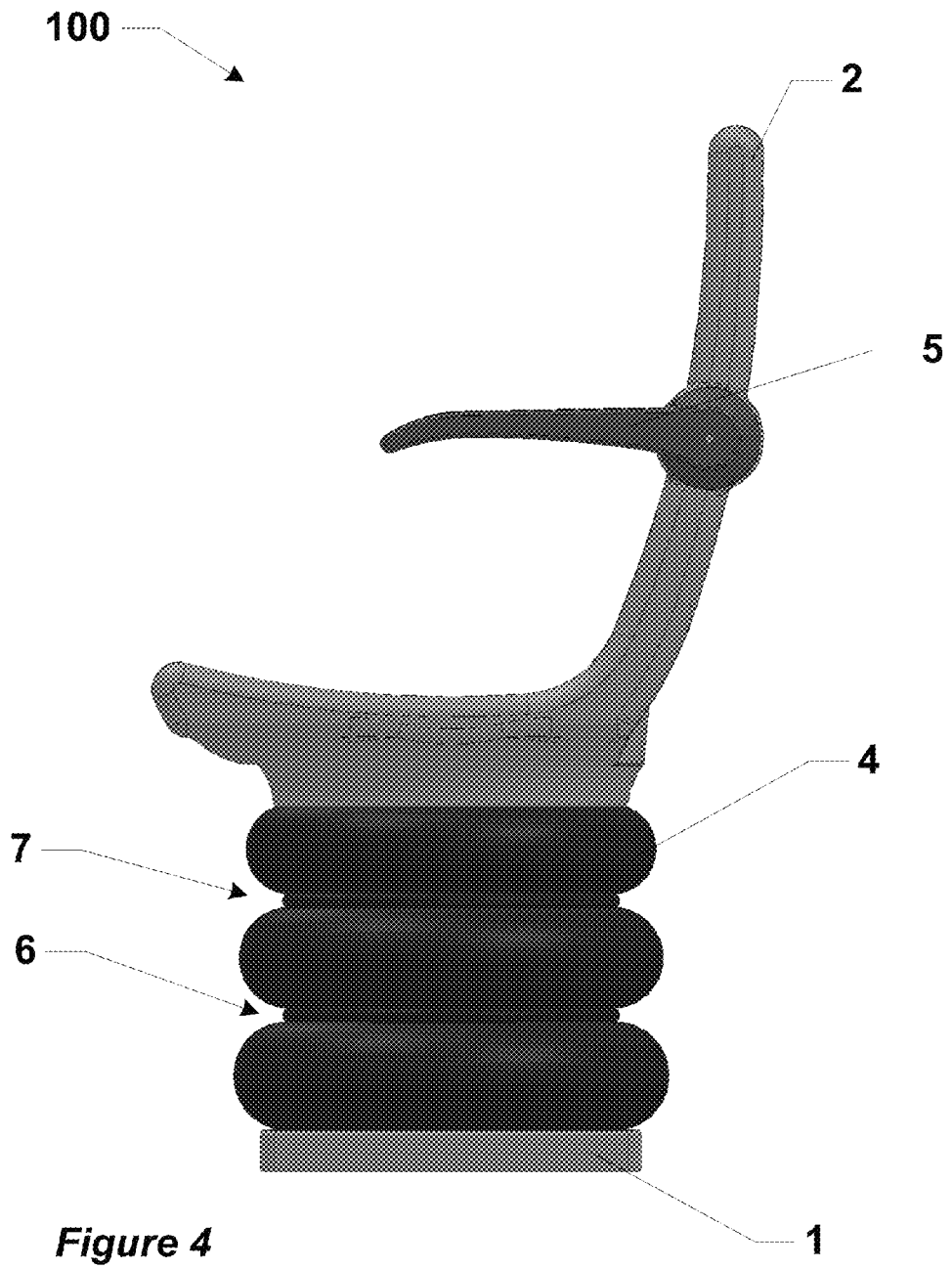
Figure 5:
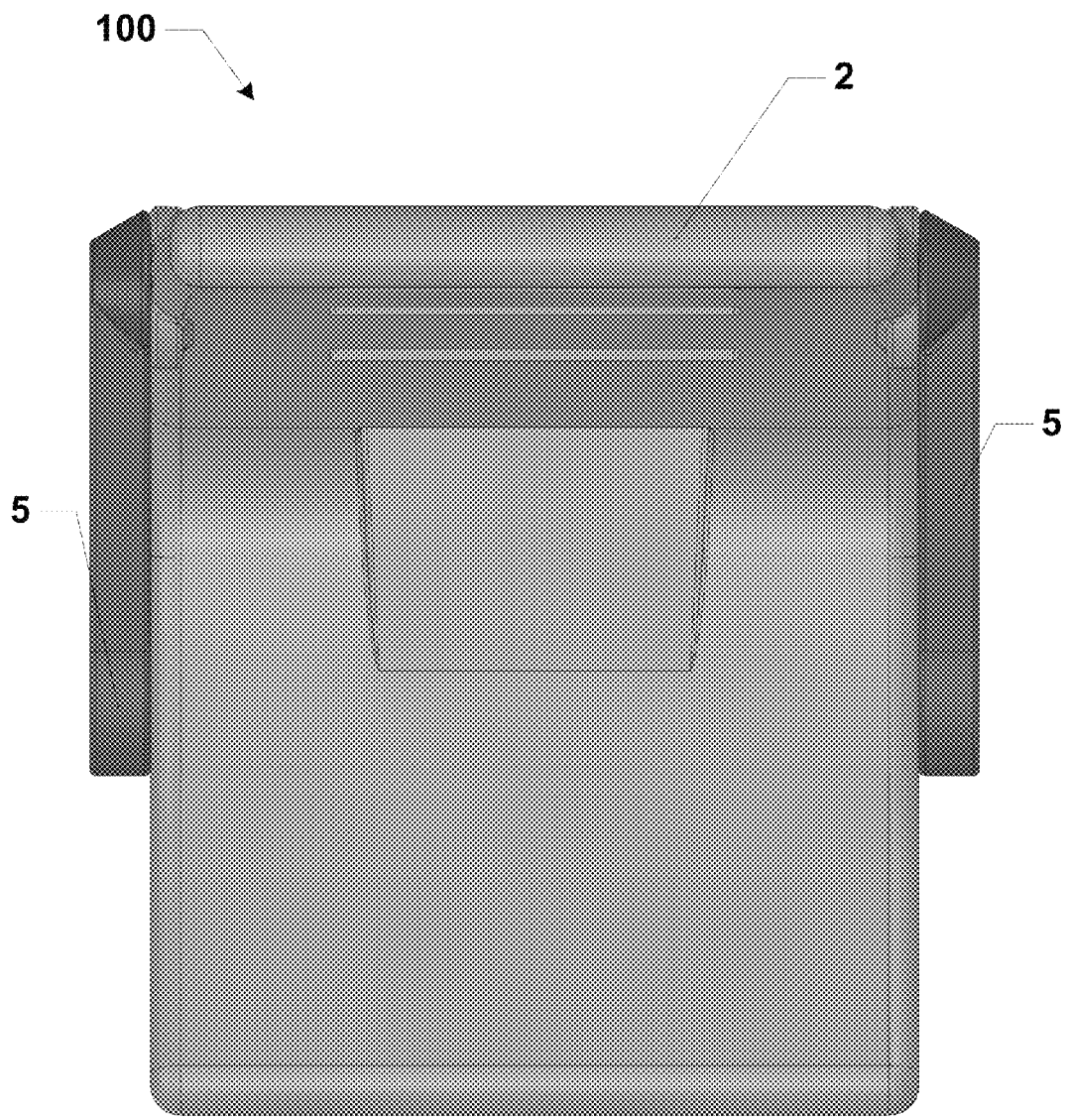

While this application describes a seat for the preferred application of a rotationally molded boat other water-borne vehicles, those are only examples. Turning to the figures, in general terms assembly 100 comprises a base 1 mounted to the hull or deck of the boat (perhaps through an intermediate mounting system not shown) using mounting holes 11 or other features supporting the connection. For example, if threaded nuts or similar features are molded into the boat, the seat may be bolted to the boat though the mounting holes 11. Other means for attachment are equivalent. By way of example only, six mounting holes 11 are provided in base 1, only three of which are visible in FIG. 1.

Figure 6:
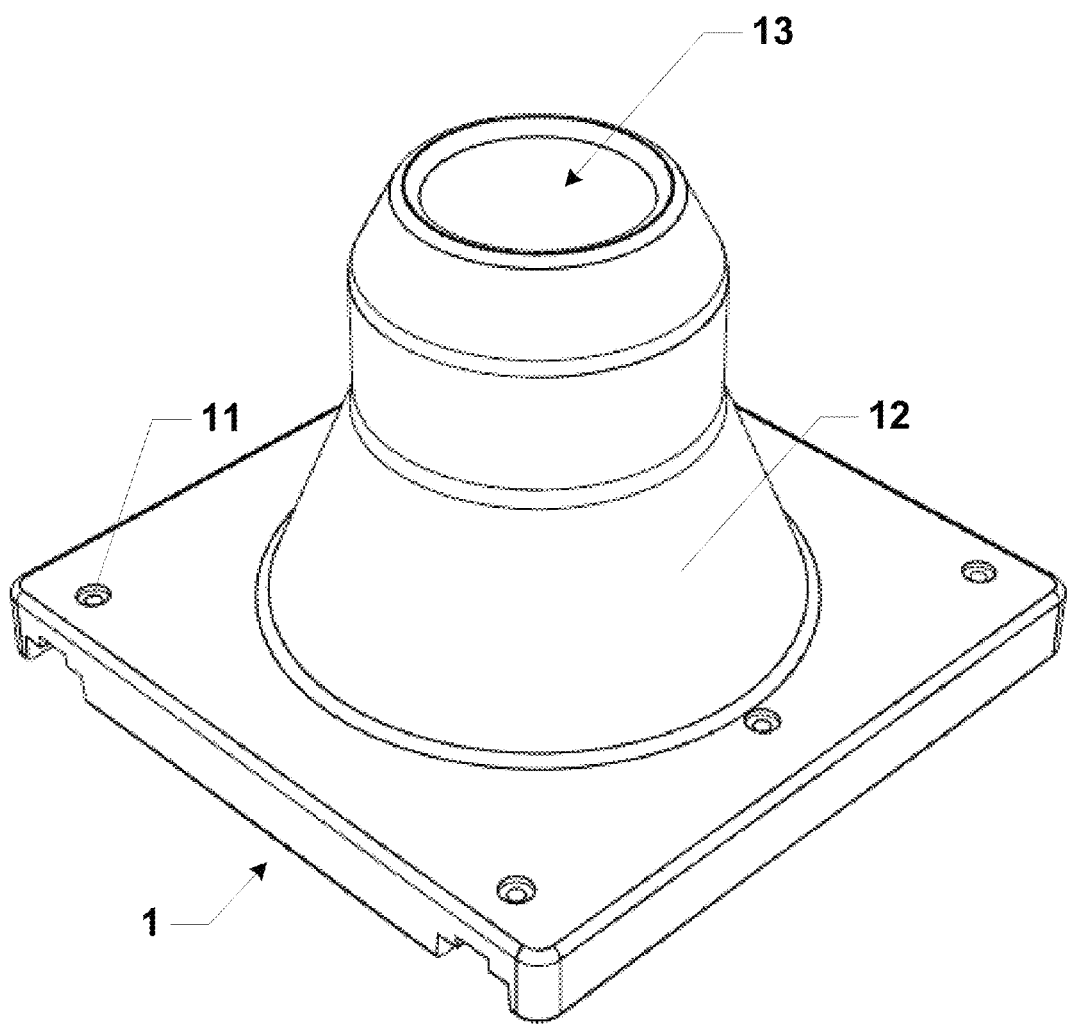
FIG. 6 is a perspective view of a portion of the assembly of FIGS. 1-5.

Turning briefly to FIG. 6, a pedestal 12 (not visible in FIGS. 1-5) is mounted or molded into the base 1. The seat 2 is mounted into central opening 13 formed in the pedestal 12 combination.

Returning to FIGS. 1-5, the seat 2 is preferably a single molded piece (not considering any stiffening members which may be molded into it), generally L-shaped in profile and contoured according to conventional principles. Either or both sides of the seat may have optional armrest(s) 5 that may be formed by a pin-and-socket arrangement (for example) so that they may be folded up or down as desired. It is desirable for purposes of reducing weight and material usage, and to ensure sufficient flow of the material during molding, that one or more openings be molded into the seat.

In general, the components of the base 1 and seat 2 are rotationally molded polymers or marine-environment-suitable metals. Materials are selected based on a sufficient balance of cost, strength, weight, ease of handling, and the like. Preferred molding materials for high performance watercraft and similar applications are high density cross-linked polyethylenes (HDXLPE), which are commercially available. Other materials known to be suitable for rotational molding may also be used, including the less costly (but less strong) high density polyethylenes (HDPE) which are also commercially available. The base 1 has a preferred thickness of 0.156 inch and preferably a sandblasted finish, but those are only examples.

A permanently or temporarily inflated air bag 4 surrounds the pedestal 12 to provide cushioning and, in the preferred embodiment, approximately 4 inches of vertical clearance to absorb forces. The air bag 4 is generally similar to that described in U.S. Pat. No. 4,560,145 (Widmer), the entire contents of which is incorporated by reference. In general, the air bag is an inflatable member made of a flexible material, having a uniform thickness and comprising a plurality of annular sections. The sections sequentially taper in diameter to form a generally pyramidal shape. The air bag may be inflated by conventional means, e.g., as described in the Widmer '145 patent incorporated by reference.

Two rings 6, 7 (FIGS. 2-4) help maintain the performance of the air bag. The upper and lower rings, one between each pair of adjacent sections of the air bag, extend around the outside of the air bag to provide annular support between the sections and to control bulges and stretching. The rings provide support without the danger of the inflatable member "thinning" in the ring area when inflated. "Thinning" of the inflatable member could result in a rupture or bulge. Each ring has a circular cross section. Preferred dimensions for the O-rings are 10.47 inch (26.6 cm) and 11.21 inch (28.5 cm) diameter for the upper and lower rings, respectively, each being 0.5 inch (1.27 cm) in cross-sectional diameter.

Figure 7:
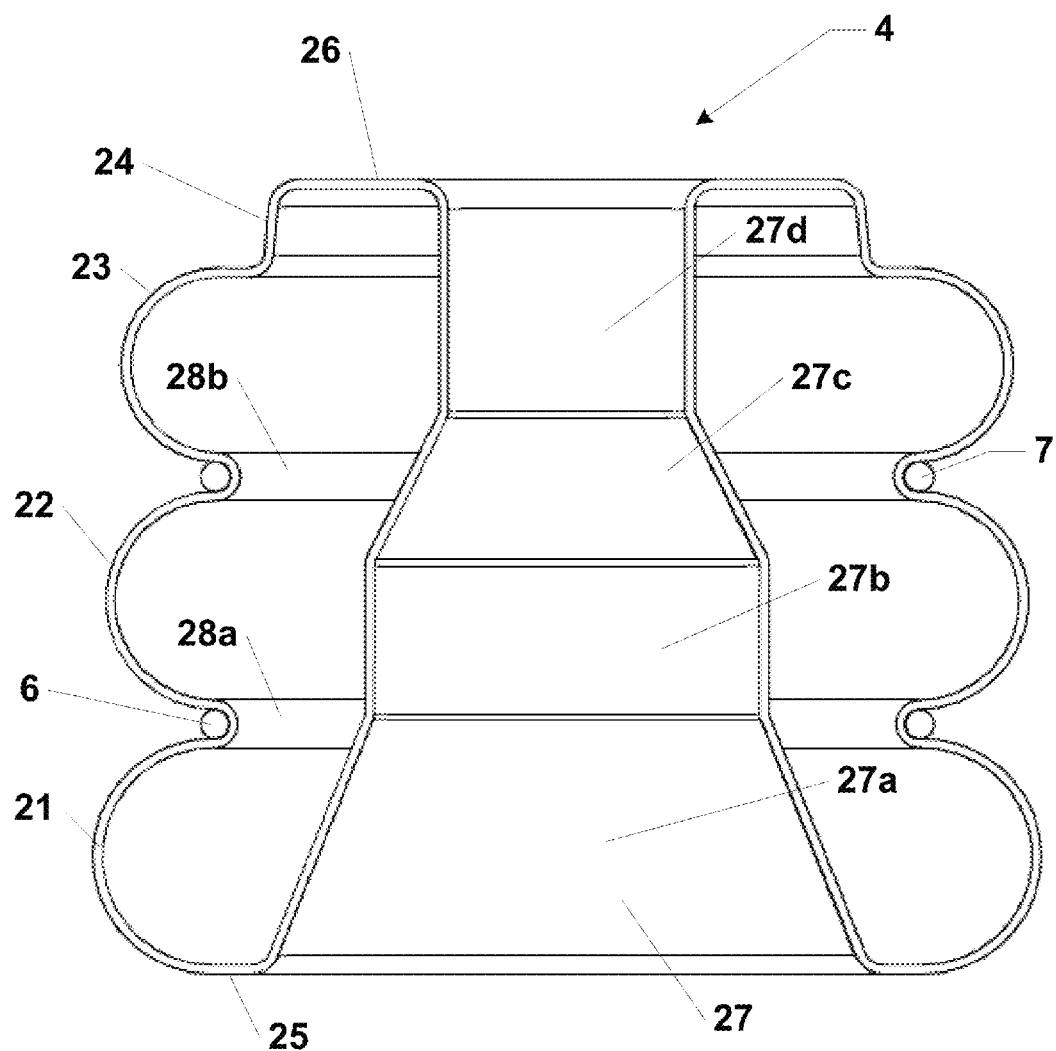
FIGS. 7 and 8 are cross-sectional views of portions of the assembly of FIGS. 1-5.

Turning to FIG. 7, viewed from the side in cross-section, the air bag 4 has three generally toroidal sections 21, 22, 23 stacked above and connected to each other, and a smaller cylindrical section 24 stacked above and connected to the uppermost section 23 of the three toroidal sections. The bottom and top faces 25, 26 are generally flat to accommodate the upper flat surface of the pedestal and the lower surface of the annular region of the underside of the chair, respectively. The central portion 27 of the air bag is generally cylindrical and has an inner diameter profile corresponding to the outer diameter profile of the pedestal. That profile can be understood as being a series of four cylindrical portions, the first (lowest) and third portions 27a, 27c having inwardly (proceeding in the upward direction) sloping sides and the second and fourth (highest) portions 27b, 27d having vertically straight sides (e.g., right circular cylinders). The transitions between such sections are beveled or rounded as appropriate, as are the lower and upper ends of central portion 27. Each of the two transitions 28a, 28b where two immediately adjacent toroidal sections join together defines upper and lower necks around the outer surface of the air bag. These locations are where the upper and lower O-rings 6, 7 are located. These locations correspond to the locations of the top of pedestal 12 and shoulder 32c discussed further below.

In terms of materials, the air bag 4 is constructed from polymer such as a suitable elastomer, e.g., a vinyl plastic of about 70 durometer on the A scale. The O-rings 6, 7 are made of elastic or elastomeric material, such as neoprene rubber, for example in the range of 80 durometer. As noted above, in the preferred embodiment illustrated in the Figures, the air bag 4 provides approximately four inches of cushioned vertical travel in the preferred embodiment.

Figure 8:
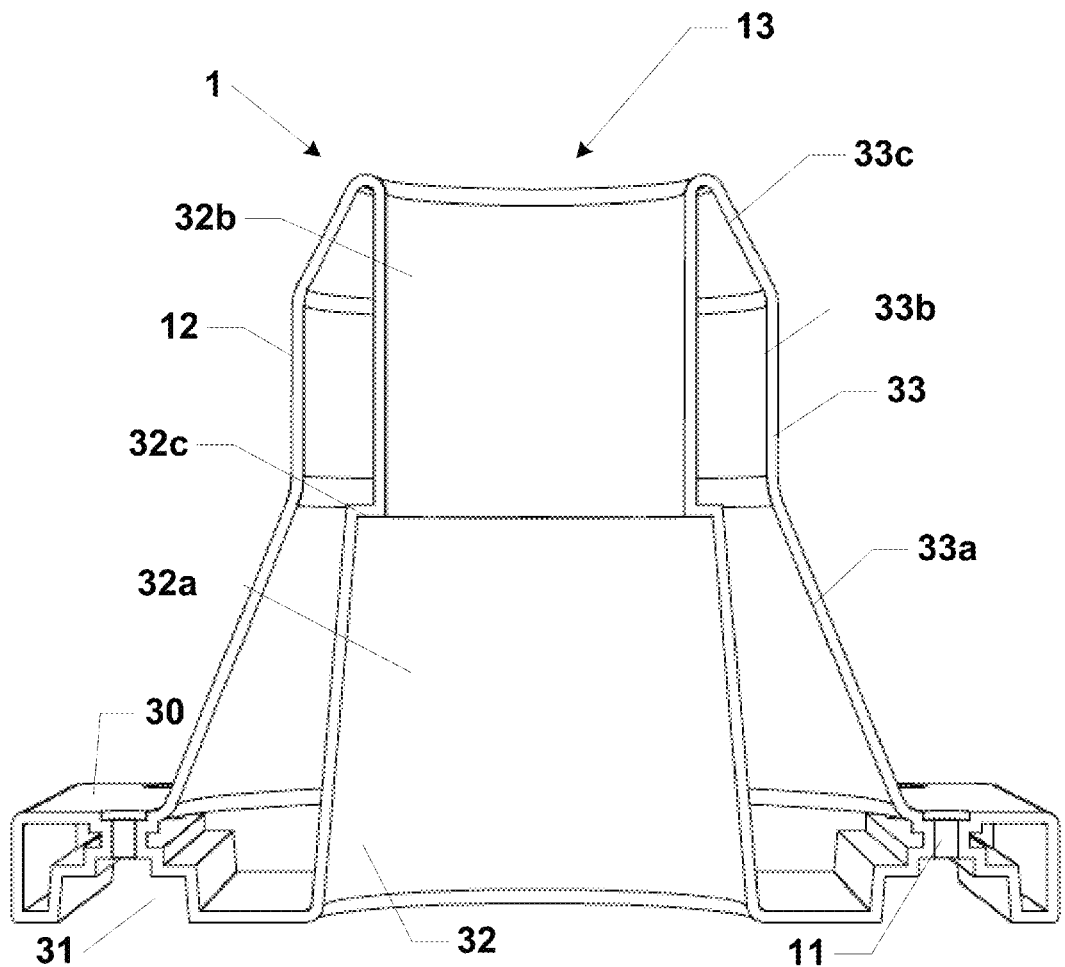

Turning to FIG. 8, base 1 is a preferably a single piece but can be an assembly of multiple pieces if desired (although strength and performance may suffer). As illustrated, it comprises a plate section 30 defining a pair of straight, downward-opening channels 31 that may be used to adjust its position relative to the boat deck or hull. The pedestal 12 is axially symmetric and generally conical, extending above the flat plate section 30. The air bag 4 described above is mounted around the pedestal, and the seat 2 described above is mounted (above the uppermost surface of the air bag 4) above the pedestal 12. As the cross sectional view illustrates, the inner and outer faces 32, 33 of the pedestal 12 need not be identical, and in the preferred embodiment they have surface profiles which are not similar to each other (i.e., they are not "parallel" to each other) at all. The inner face 32 is generally a pair of axially aligned right circular cylinders 32a, 32b (although the lower 32a is slightly tapered in the preferred embodiment illustrated). The diameter of the upper 32b is less than that of the lower 32a, producing a shoulder 32c where they meet. The outer face 33 has three axially concentric sections, a lowermost section 33a being more noticeably tapered than its corresponding inner diameter profile, for strength and additional stability. The middle section 33b is a right circular cylinder and the uppermost section 33c tapers inward. As noted elsewhere, these three outer profiles conform to the three lowermost portions 27a, 27b, and 27c of the inner profile of air bag 4. The inner profile is designed to provide maximum support for the seat as it undergoes vertical motion due to the high-performance environment in which it is placed.

Figure 9:
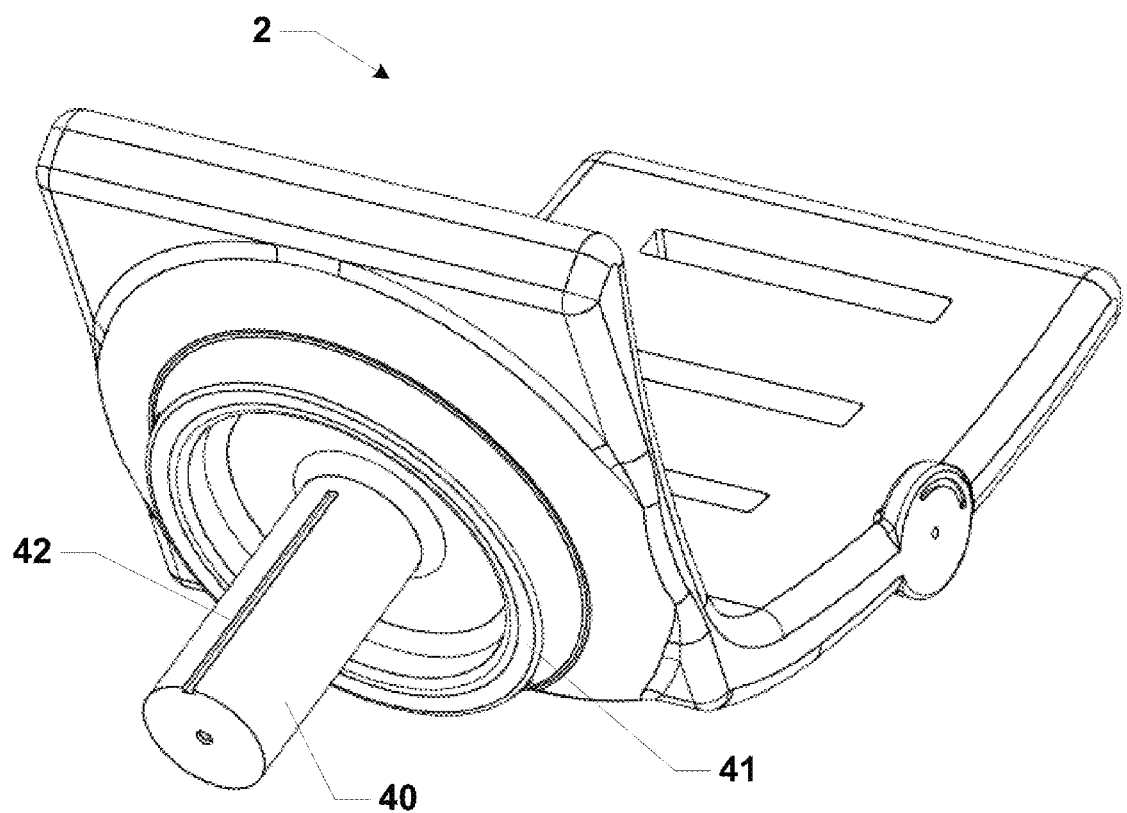
FIG. 9 is a lower perspective view of the seat component of the assembly of FIGS. 1-5.
Figure 10:
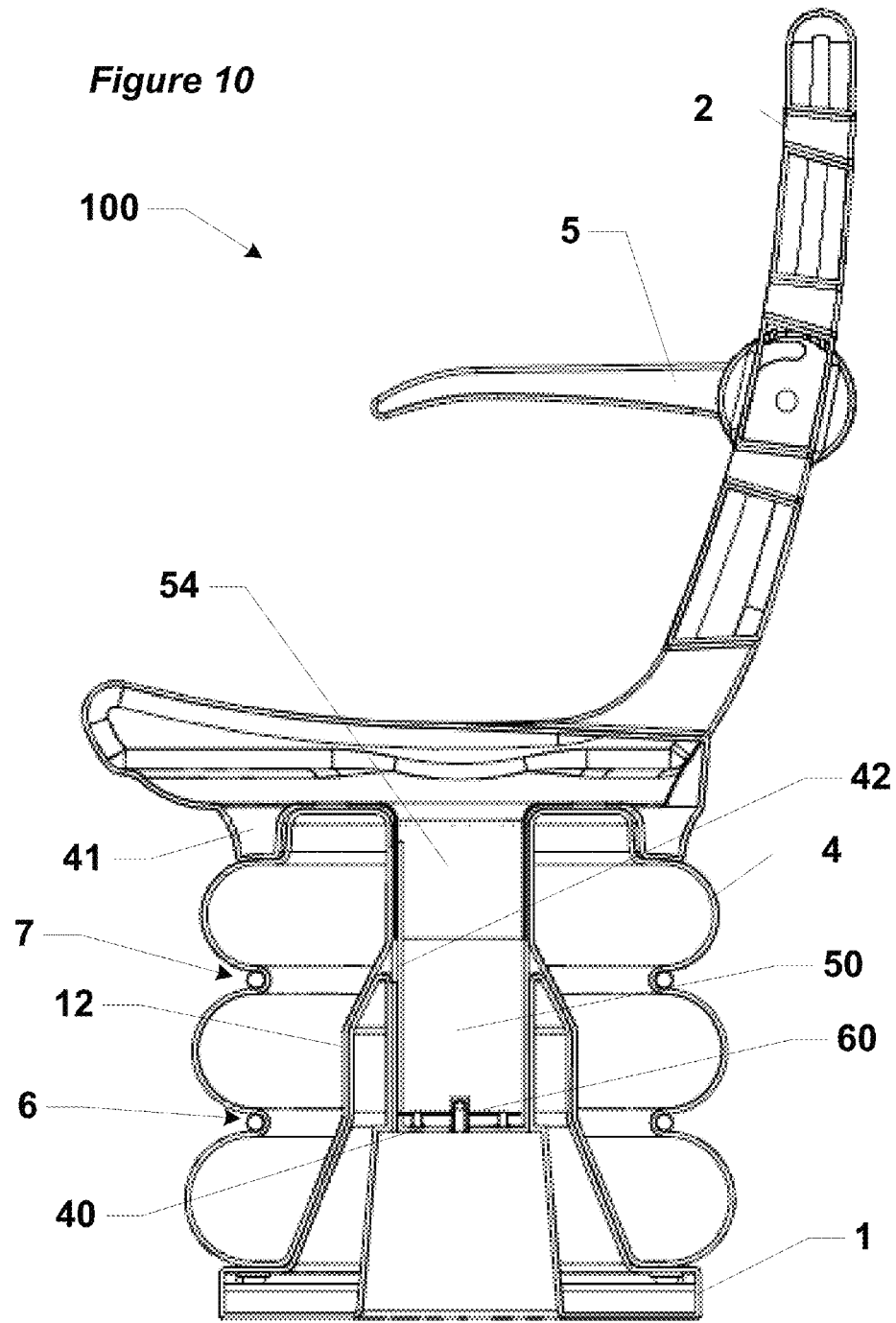
FIG. 10 is a partial cut-away side view of the assembly of FIGS. 1-5, as indicated in FIG. 4.

Turning to FIG. 9, the lower face of the seat 2 includes a shaft 40 or similar extension for insertion into the central opening 13 of the pedestal (see FIGS. 6, 8, and 10). For example, such a feature could be molded directly into the seat 2. Surrounding shaft 40 is annular ridge 41 which fits around the outer diameter of the uppermost portion 24 of air bag 4 (see FIG. 7). The lower face of seat 2 then fits against upper face 26 of air bag 4. This arrangement keeps the seat aligned with the vertical axis despite the forces created by downward motion of the seat toward the boat (or upward motion of the boat toward the occupant of the seat) being transferred into compression of the air bag. Considering also FIG. 8, the length of the shaft 40 must be sufficient to extend substantially into the upper portion 32b of pedestal 12, or about eight inches beyond the lower edge of annular ridge 41 in the preferred embodiment. Thus, considering also FIG. 7, the end of shaft 40 extends into central opening 13, occupying the space corresponding to portions 27b, 27c and 27d of air bag 4.

Figure 11:
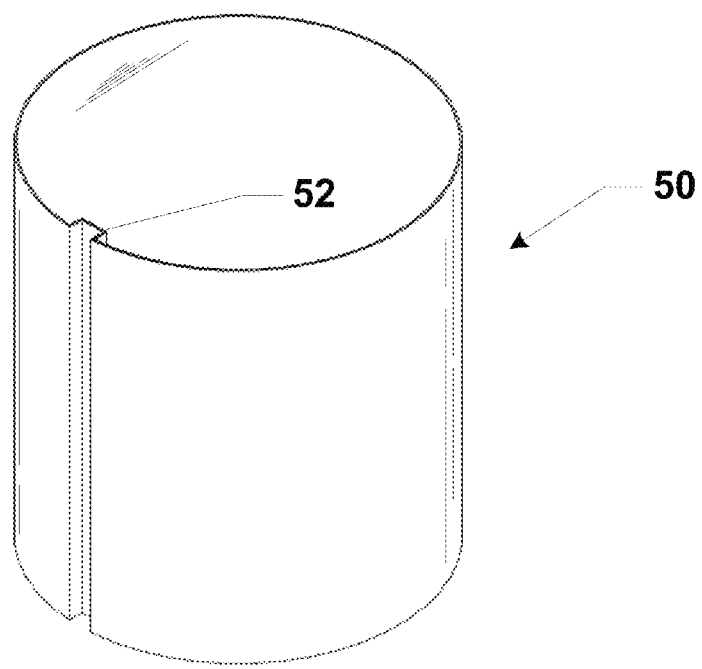
FIGS. 11-13 are perspective views of other components of the assembly of FIGS. 1-5.

Returning briefly to FIG. 9, shaft 40 is provided with a slot or keyway feature 42. This is the preferred embodiment of any feature which prevents rotation of the seat around the vertical axis. Because the lower face of the seat (at the top of shaft 40 and within the diameter of annular ridge 41) lies against the top surface 26 of air bag 4, rotation of the seat would introduce undesirable wear and tear on the air bag. In conjunction with slot 42, to provide a smoother surface fit for the outer surface of shaft 40 as it travels up and down within central opening 13, a mold-in sleeve 50 as shown in FIG. 11 is added to the inner diameter of the pedestal. The mold-in sleeve 50 is a hollow cylinder having an inner diameter only slightly greater than the outer diameter of shaft 40, and an inwardly extending mating ridge 52 formed into its entire height. The cross-sectional shape of the ridge 52 is a matter of preference—provided it is compatible with the slot 42 of shaft 40, which typically but not necessarily means the profiles are identical—and thus in the preferred embodiment illustrated, it is rectangular. In the preferred embodiment, mold-in sleeve 50 is incorporated into the pedestal during rotational molding but it could be added afterward in other embodiments. Also, as illustrated, in the preferred embodiment the slot 42 faces forward (and thus the ridge 52 faces backward, or aft in the case of a nautical or aeronautical installation), but this is only a matter of choice. In the most preferred embodiment, for a radius of 4.0 inch (10.2 mm) and 0.020 inch (0.51 mm) material thickness, the channel may be 0.31 inch (7.9 mm) wide and 0.19 inch (4.8 mm) deep. (The preferred corresponding dimensions of slot 42 are 0.33 inch (8.4 mm) and 0.19 inch (4.8 mm), respectively, as a tight fit is desired.) A preferred height of the mold-in sleeve is 4.38 inch (11.1 mm). The preferred material is type 316 stainless steel.

Figure 12:
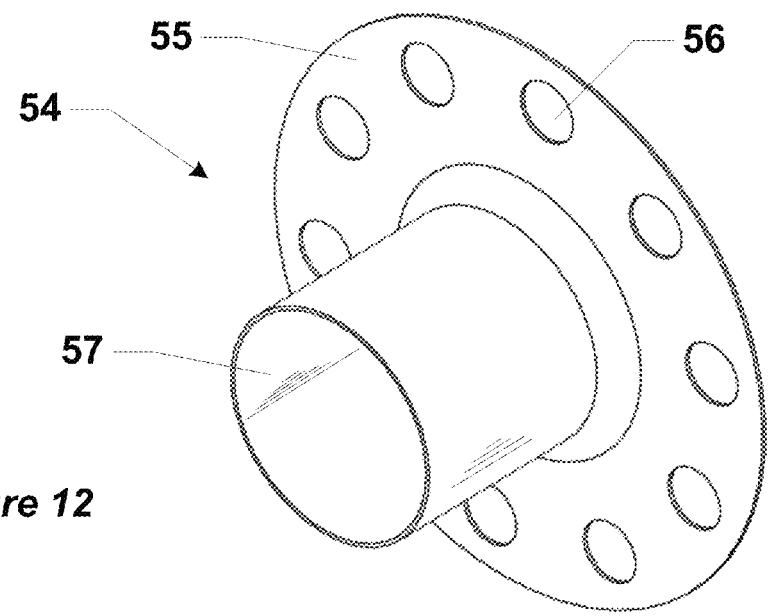

Turning to FIG. 12, to improve the strength and rigidity of seat 2, a flanged pedestal support plate 54 is molded into the seat. The uppermost plate portion 55, which aligns with the underside of the seat, is preferably circular in the horizontal plane but could be other shapes. As illustrated, it has several holes 56 (nine are visible of the ten provided in the preferred embodiment) to reduce weight without sacrificing strength and to allow for the polymeric material that forms the seat to flow through the holes and increase the strength of the plate/seat combination. The pedestal support plate further includes a hollow cylindrical extension portion 57, which extends downward into the shaft 40 described above.

Figure 13:
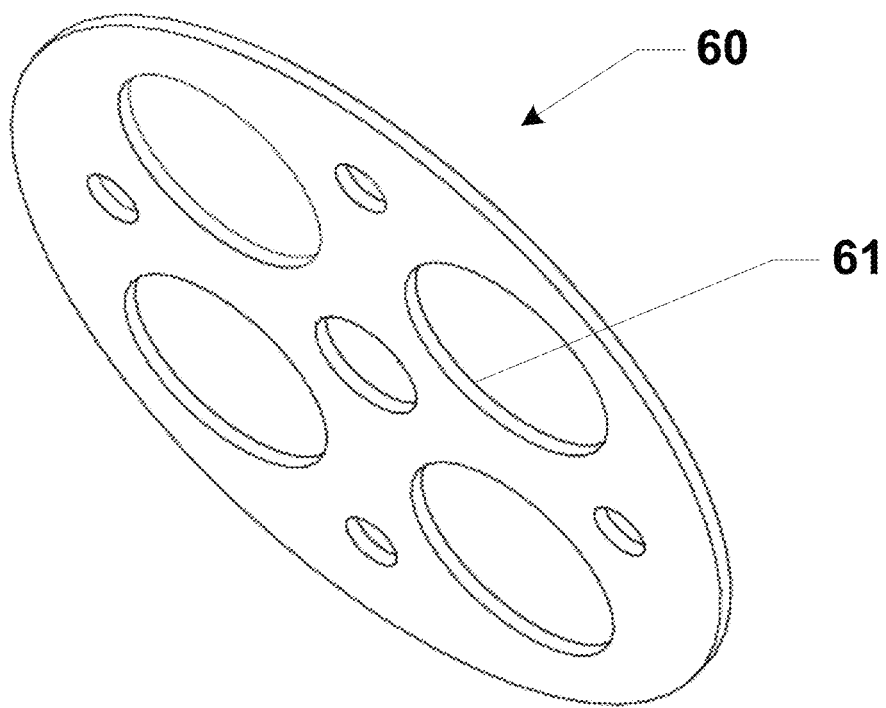

FIG. 13 illustrates a plate 60 which may be molded into the lowermost portion of shaft 40 to add strength and rigidity. Like the uppermost plate portion 55 of pedestal support plate 54, plate 60 is preferably circular in the horizontal plane but could be other shapes. As illustrated, it has several large diameter holes 61 to reduce weight without sacrificing strength and to allow for the polymeric material that forms the seat to flow through the holes and increase the strength of the plate/shaft combination. The central hole may support a bolt lug (connected to a centered hole in the outer surface of the end of the shaft), and the four smaller holes may support studs. Plate 60 is preferably molded into shaft 40 adjacent its lowest end.

Applications

In addition to the applications noted above, specifically preferred applications are boats which are required to withstand blast, impact, and/or structural loads when they are used to blow up mines, when moving through rough seas at high speed and/or when they are hoisted aboard another structure (e.g. another vessel or a platform). Although the principles above are described and illustrated primarily with respect to boats and other watercraft, such articles are only examples. Other transportation vehicles, and the like, such as airplanes, could be considered.

Preferred Dimensions

In addition to dimensions noted above, specifically preferred dimensions for the preferred embodiment of a seat suitable for a high performance boat of the type described above include the following. Overall front-back seat length: 22.5 inch (57.2 cm). Seat width: 19 inch (48.3 cm). Seat height above deck: 18.74 inch (47.6 cm). Arm rest height above deck: 27.97 inch (71.0 cm); pivot point of arm rest height above front edge of seat: 7.25 inch (18.4 cm). Base dimensions: 14 inch (35.6 cm) square and 1.5 inch (3.8 cm) thickness; 6.0 inch (15.3 cm) hole separation, 11 inch (27.9 cm) track-to-track pitch, 1.5 inch (3.8 cm) side clearance and 1.0 inch (2.5 cm) front/back clearance measured from the centerline of each hole to the edge of the base plate. Seat shaft diameter: 4 inch (10.2 cm). Seat shaft length: 8 inch (20.3 cm). Annular ridge inner diameter: 8.25 inch (21 cm); annular ridge outer diameter: 9.75 inch (24.8 cm); annular ridge height: 1.5 inch (3.8 cm).

I claim:

1. A lightweight seat, comprising: a base having a pedestal with an exterior surface which extends above the base, the pedestal defining within itself a central internal opening; a seat having a shaft which extends downwardly; and a flexible inflatable air bag having an inner surface which surrounds and conforms to the exterior surface of the pedestal and an annular upper surface upon which the seat rests such that the shaft extends through a open center of the annular upper surface of the air bag into the central internal opening of the pedestal; in which the air bag comprises a plurality of annular sections which sequentially taper in diameter to form a generally pyramidal shape.

2. The lightweight seat of claim 1, further comprising at least one circular ring around a narrowed-diameter portion of the air bag between pairs of adjacent sections of the air bag, each ring annularly supporting the narrowed-diameter portion to control bulging of the air bag.

3. The lightweight seat of claim 1, in which the air bag cushions vertical motion of the seat.

4. The lightweight seat of claim 1, in which the plurality of annular sections comprises at least one generally toroidal section.

5. The lightweight seat of claim 1, in which the air bag comprises three generally toroidal sections stacked above and connected to each other, and a cylindrical section stacked above and connected to the uppermost of the three toroidal sections.

6. The lightweight seat of claim 1, further comprising at least one arm rest.

7. The lightweight seat of claim 1, in which the pedestal has inner and outer surface profiles which are not similar to each other.

8. The lightweight seat of claim 1, in which the pedestal has an inner surface profile which comprises a pair of axially aligned right circular cylinders having different diameters.

9. The lightweight seat of claim 1, in which the pedestal has an outer surface profile which comprises three axially concentric sections including an inwardly tapered lowermost section, a right circularly cylindrical middle section, and an inwardly tapered uppermost section.

10. The lightweight seat of claim 1, in which the seat comprises a feature which engages the pedestal to prevent rotation of the seat around a vertical axis.

11. The lightweight seat of claim 1, in which the seat comprises a shaft which extends substantially into a cylindrical support molded to an inner surface of the pedestal.

12. The lightweight seat of claim 1, in which the shaft extends from an underside of the seat and a flanged pedestal support plate molded into the seat, the support plate comprising a plate portion which aligns with the underside of the seat and a hollow cylindrical extension which extends within the shaft.

\* \* \* \* \*